Patented Apr. 25, 1933

1,906,102

UNITED STATES PATENT OFFICE

ERIK LUDVIG RINMAN, OF DJURSHOLM, SWEDEN

METHOD OF ALKALIZING THE WASTE LIQUORS FROM THE SODA OR SULPHATE PULP MANUFACTURE FOR THE PURPOSE OF MAKING THEM SUITABLE FOR DRY DISTILLATION

No Drawing. Application filed June 30, 1930, Serial No. 465,067, and in Sweden May 23, 1930.

My invention relates to an improved method of alkalizing the waste liquors from the soda or sulphate pulp manufacture for the purpose of making them suitable for dry distillation, and has for its purpose to simplify the manner in which such alkalization may be carried out in practice.

In my Patent No. 1,852,264, granted April 5, 1932, I have described a method of alkalizing the waste liquors from the soda or sulphate pulp manufacture for the purpose of making them suitable for dry distillation, which method principally consists in effecting the alkalization with oxides or hydroxides of barium or strontium, or a mixture of both, optionally in combination with a neutral substance, for instance carbon powder. According to my said earlier method, oxides or hydroxides of calcium, magnesium, aluminium, zinc, or iron, or mixtures thereof, may be added during the alkalization. When alkalization has been effected in this manner, the mass is evaporated to a suitable degree of dryness, and is dry distilled.

According to the present improvement the alkalization is effected by adding oxides of alkalization is effected by adding oxides of barium or strontium, or mixtures of such oxides with each other or with oxides of calcium, magnesium, aluminium, zinc, or iron, in a pulverized state to the strongly concentrated hot waste liquor. For this purpose the waste liquor should be concentrated to hold between 50 and 60 per cent dry substance, and should be as hot as possible when the oxides are added.

In this manner, when the oxides are added, a violent reaction sets in with such strong generation of heat that the greater portion of the water of the waste liquor evaporates, and therefore, when the reaction is completed, the waste liquor is transformed into a pulverulent mass the consistency of which resembles ordinary vegetable mould, and which is directly ready for dry distillation. The mass should suitably be stirred during the reaction. This manner of carrying out the alkalization thus gives directly, without special evaporation, a pulverulent mass which may be dry distilled without sintering or melting in dry distillation furnaces for continuous operation, as described in said earlier patent.

The following may serve as an example of suitable proportions of the substances added during the alkalization. When alkalizing a waste liquor obtained by digesting esparto with caustic soda, there may be used with a quantity of waste liquor corresponding to 1 kg. absolutely dry esparto, a pulverized mixture of 800 g. BaO, 100 g. BaCO$_3$, 100 g. CaO and 15 g. BaO$_2$. The black liquor which contains about 660 g. dry material, should be concentrated to a total weight of about 1200 g. The addition of barium dioxide, BaO$_2$, is suitable in view of the fact that the waste liquor often contains sulphur. By the addition of barium dioxide such sulphur is transformed into sulphate.

If also the barium oxide used contains sulphur in the state of barium sulphide, such great quantity of barium dioxide should be added that also the barium sulphide is transformed into sulphate. In this manner it is possible to attain the result that no sulphur containing contaminations are present in the distillate obtained by the dry distillation. The distillate obtained will be absolutely free from sulphur, if a sufficient quantity of barium dioxide is added to the waste liquor before or simultaneously with the barium oxide. The barium sulphate is always reduced to barium sulphide when the barium carbonate of the dry distillation residue is regenerated as barium oxide by a deoxidizing burning. In order that the sulphur quantity shall not be increased by repeated use of the same quantity of barium, it is only necessary each time to separate about 5 to 10 per cent of the barium oxide regenerated by the burning, and leach said quantity with water, so that barium hydroxide and barium sulphydrate are formed. The former is again used in the process, while the barium sulphydrate is separated and treated with carbon dioxide to recover carbonate.

If silica is present, this substance may be removed simultaneously with the sulphur by boiling out barium hydrate from the separated 5 to 10 per cent barium oxide, whereby calcium hydroxide and calcium silicate are obtained as residue. This implies, of course, that the alkalization is effected with a mixture of barium and calcium oxides, which has proved particularly suitable in practice.

If waste liquors from the wood or straw cellulose manufacture are to be treated according to the present method, such treatment is effected in a similar manner. It is only necessary to observe that the waste liquor has such concentration that, when the reaction with the added oxides has taken place, a brownish powder is obtained. A too high concentration of the waste liquor, for instance one corresponding to a weight of 340 g. water on 660 g. dry material, is not advisable, however, since the yield of valuable chemical substances during the dry distillation is thereby decreased. Also, the addition of barium dioxide is chosen in such manner that no sulphur containing substances appear in the distillate.

A waste liquor obtained by complete digestion of vegetable substances with caustic soda lye, may also be alkalized, according to the present method, in such manner that a powder is obtained which does not sinter when heated in a continuously operated dry distillation furnace. The following may serve as an example: 1 kg. coniferous wood is digested with 700 g. sodium hydroxide and 1000 g. water, including the quantity of water present in the wood, at a temperature of 180° C. The waste liquor obtained is evaporated to a weight of 2000 g. and is mixed in a hot state with a pulverized mixture of 1000 g. BaO, 100 g. BaCO$_3$ and 100 g. CaO. When the reaction thus caused is finished, the mixture is obtained in the state of a brown powder which is ready for dry distillation, for instance in an externally heated rotary furnace.

The method of alkalization above described not only possesses the advantages that it saves heat and work in comparison to the method described in my earlier patent, but it also possesses the advantage that it gives a greater yield of valuable chemical products during the dry distillation. When carrying out the alkalization according to the present method it is also possible to mix the oxides used for the alkalization with a suitable quantity of residue from a preceding dry distillation, for in this manner to cause the dry distillation to take a slower course. In view of the fact that the pulverulent mass obtained by the alkalization may occasionally contain so much moisture that it has a tendency to bake together if heated in unstirred layers, it is suitable to perform the dry distillation in a rotary furnace.

It will be obvious that the barium compounds used in the present method may be replaced by the corresponding strontium compounds, and the term "barium" used in the claims should therefore be understood as being equivalent to strontium.

Similarly, instead of oxide of calcium, or together with oxide of calcium, oxides of magnesium, aluminium, zinc or iron may be used, and the term "oxide of calcium" used in the claims should therefore be understood as being equivalent to such oxides.

Also, since as above stated the method is applicable to waste liquors from the sulphate pulp manufacture, the term "soda pulp" should be understood as being equivalent to sulphate pulp.

I claim:

1. The method of alkalizing waste liquors from the soda pulp manufacture for the purpose of making them suitable for dry distillation, which comprises concentrating the waste liquor to hold about 50 per cent dry substance, and alkalizing said concentrated waste liquor while hot by adding to and intimately mixing with the same barium oxide in a pulverized state so as to cause a reaction which generates sufficient heat to drive off the major portion of the water so that a pulverulent mass ready to be dry distilled is obtained.

2. The method of alkalizing waste liquors from the soda pulp manufacture for the purpose of making them suitable for dry distillation, which comprises concentrating the waste liquor to hold about 50 per cent dry substance, and alkalizing said concentrated waste liquor while hot by adding to and intimately mixing with the same a mixture of barium oxide and oxide of calcium in a pulverized state so as to cause a reaction which generates sufficient heat to drive off the major portion of the water so that a pulverulent mass ready to be dry distilled is obtained.

3. The method of alkalizing waste liquors from the soda pulp manufacture for the purpose of making them suitable for dry distillation, which comprises concentrating the waste liquor to hold about 50 per cent dry substance, and alkalizing said concentrated waste liquor while hot by adding to and intimately mixing with the same barium oxide in a pulverized state so as to cause a reaction which generates sufficient heat to drive off the major portion of the water so that a pulverulent mass ready to be dry distilled is obtained and such quantity of barium dioxide that sulphur present in the waste liquor and in the added oxide is transformed into sulphate.

4. The method of alkalizing waste liquors from the soda pulp manufacture for the purpose of making them suitable for dry distillation, which comprises concentrating the waste liquor to hold about 50 per cent dry substance, and alkalizing said concentrated waste liquor while hot by adding to and intimately mixing with the same a mixture of barium oxide and oxide of calcium in a pulverized state so as to cause a reaction which generates sufficient heat to drive off the major portion of the water so that a pulverulent mass ready to be dry distilled is obtained and such quantity of barium dioxide that sulphur present in the waste liquor and in the added oxides is transformed into sulphate.

ERIK LUDVIG RINMAN.